United States Patent [19]

Kay

[11] 4,010,373
[45] Mar. 1, 1977

[54] PATIENT RESTRAINING DEVICE FOR THE PINHOLE COLLIMATOR AND GAMMA SCINTILLATION CAMERA

[76] Inventor: Thomas D. Kay, 2814 Knight Robin, San Antonio, Tex. 78209

[22] Filed: Oct. 10, 1975

[21] Appl. No.: 621,328

[52] U.S. Cl. .............................. 250/456; 250/366
[51] Int. Cl.² ............... G01N 21/00; G01N 23/00; G01T 1/20
[58] Field of Search ........................ 250/366, 456

[56] References Cited
UNITED STATES PATENTS 3,831,033  8/1974  Chapa .......................... 250/366

Primary Examiner—Alfred E. Smith
Assistant Examiner—T. N. Grigsby
Attorney, Agent, or Firm—Joseph E. Rusz; Jacob N. Erlich

[57] ABSTRACT

A patient restraining device for use with the pinhole collimator of a conventional Gamma Scintillation Camera, the restraining device being made of an adapter ring and a patient holder. The adapter ring is secured directly to the pinhole collimator while the holder is adjustably mounted on the adapter. The adapter ring is so designed to accommodate a variety of holders so as to enable the scanning of many different areas of a patient's anatomy by the scintillation camera.

8 Claims, 9 Drawing Figures

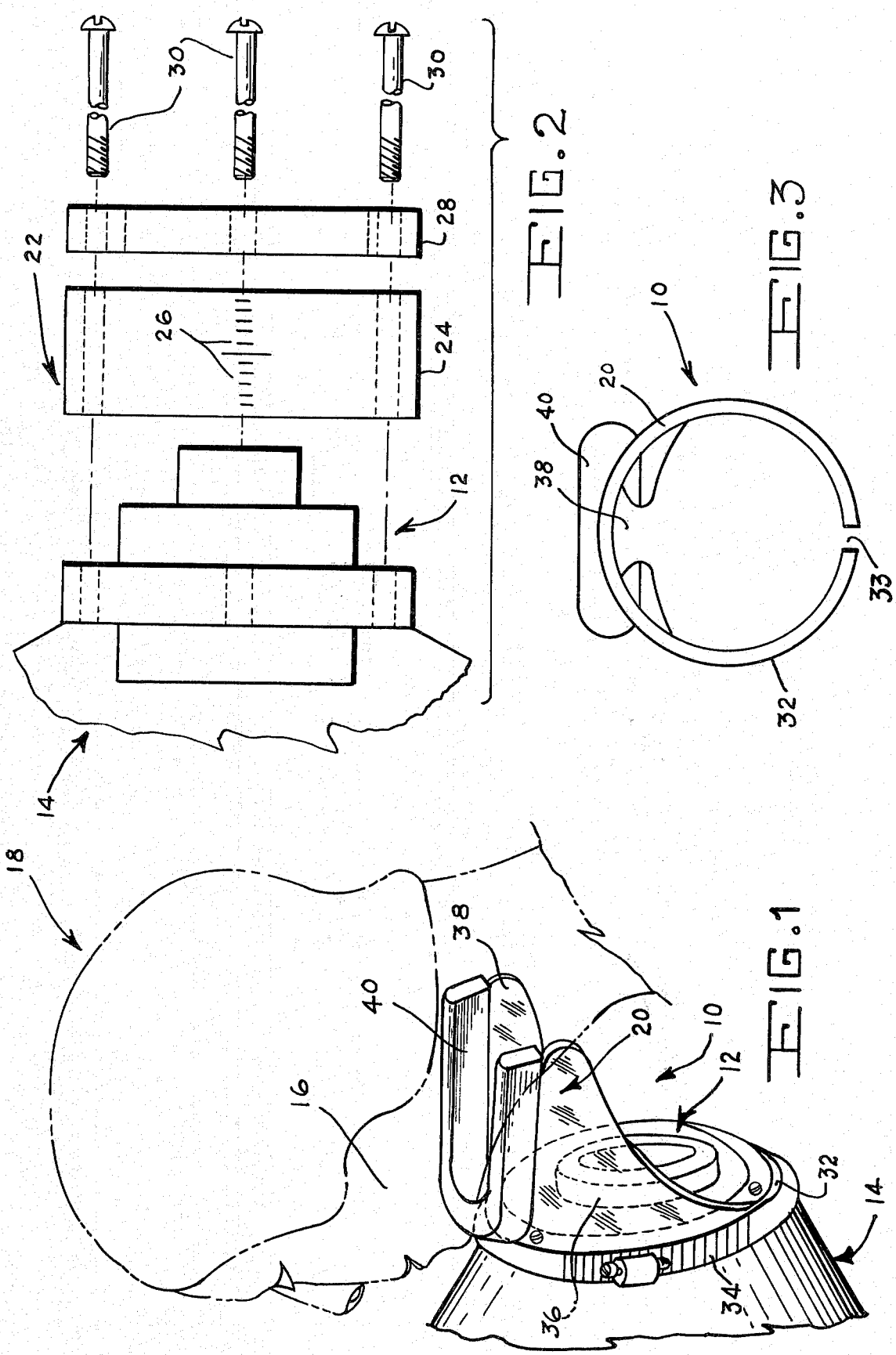

PATIENT RESTRAINING DEVICE FOR THE PINHOLE COLLIMATOR AND GAMMA SCINTILLATION CAMERA

STATEMENT OF GOVERNMENT INTEREST

This invention described herein may be manufactured and used by or for the Government for governmental purposes without the payment of any royalty thereon.

BACKGROUND OF THE INVENTION

This invention relates generally to scintiphotography, and, more particularly, to patient restraining devices which are utilized in conjunction with the pinhole collimator and Gamma Scintillation Camera during scintiphotography.

Scintiphotography is the diagnostic technique by which both normal and diseased organs within a patient can be studied by following the passage of radioisotopes through the organ. This procedure is performed by the use of a Gamma Scintillation Camera such as Nuclear Chicago's Pho/Gamma HP camera which has the ability to visualize the entire organ of interest at one time and to follow the passage of radioisotopes through the organ. Radiation from the radioisotope is rapidly detected and the position and intensity or the gamma events are produced and displayed in a corresponding position on a cathode ray tube display. Time exposures of the gamma image can be taken thereby providing studies of the organ function in both normal and diseased states.

The Gamma Scintillation Camera System is made up of a gamma detector, assembly for supporting the detector and drive motors and controls for detector orientation. Within the gamma detector is a sodium-iodide thallium activated scintillation crystal. The control console is a desk type assembly which contains an XYZ Analyser, timer, display and power supply.

The Gamma Scintillation Camera when used in conjunction with a pinhole collimator can provide information about specific organs such as the regional function of the thyroid gland. Such single pinhole collimation is ordinarily used for thyroid imaging. In evaulation for ectopic thyroid tissue and and for imaging exceptionally large goiters, the parallel hole collimators are useful. The single pinhole collimator allows use of the whole scintillation camera field of view to image the thyroid: the closer the target is to the pinhole, the larger is the target image. A problem encountered in such scintiphotography, however is that working at close distances to the camera increases angular distortion. The single pinhole collimator is also particularly useful for obtaining oblique views of the thyroid: these show the posterior aspect of the lobe nearer the aperture without superimposing the other thyroid lobe, showing cold areas obscured by overlying or underlying functional tissue in conventional anterior views. In addition, pinhole collimation finds great utility for brain and optical scanning.

It is difficult during pinhole collimation to properly position the area under observation with respect to the scintillation camera. Although pinhole collimation allows for the scanning of hard-to-reach locations on the patient, it is difficult to perform such scanning without encountering gamma scatter.

Furthermore, the counting time required to obtain an optimal image of the emission distribution from a patient using a Gamma Scintillation Camera is determined by the amount of the radioactivity administered, sensor sensitivity, lesion uptake and contrast ratio and the ability of the patient to remain still. The longer the time required for the study, the greater is the probability that significant motion artifacts will occur. Studies show that in organ scans the motion artifacts contribute to the deterioration of the quality of the image after a certain interval of time. For example, it has been found that image quality is good up to three minutes of the scan before motion artifacts reduce the useful information that can be obtained from the increased counting rate. Thus, in order to retain high diagnostic image quality in the longer duration studies, it is critical to devise improved patient restraining techniques. Heretofore, restraining techniques were quite cumbersome in construction, uncomfortable to the patient, complicated in providing adjustability to a variety of shapes and sizes and produced gamma backscatter during the scintiphotography procedure.

SUMMARY OF THE INVENTION

The instant invention sets forth a patient restraining device which is made up of a plurality of patient holders and a calibrated extension or adapter ring for pinhole collimation when utilized in conjunction with a Gamma Scintillation Camera and which overcomes the problems set forth in detail hereinabove.

The patient holders of this invention are used in combination with a calibrated extension or adapter ring which is removably mounted directly on the scintillation camera. The adapter ring has a scale scribed on at least one side thereof in order to aid in the proper alignment of various holders. Each holder is easily mounted and held in adjustable position upon the adapter ring. Specific designs for each holder of this invention allow the scintillation camera to be used for pinhole collimation of the brain, thyroid or optical system of a patient.

The adapter as well as the holders which make up the restraining device of this invention are usually constructed of a low Z number material; the adapter preferably of aluminum while the holder is made of plastic. As a result thereof Gamma backscatter during scintiphotography is greatly reduced. Proper scanning of diseased and healthy organs can be accomplished by the proper alignment and substitution of the various holders of the restraining device of this invention.

It is therefore an object of this invention to provide a restraining device which is extremely comfortable for a patient undergoing treatment by a Gamma Scintillation Camera.

It is a further object of this invention to provide a restraining device which can be easily adapted for use with the pinhole collimator of a Gamma Scintillation Camera.

It is still a further object of this invention to provide a restraining device which is constructed of a low Z number material and substantially lowers any Gamma backscatter during use with a Gamma Scintillation Camera.

It is still a further object of this invention to provide a restraining device which can change the focal length or area of the collimator to which it is attached.

It is another object of this invention to provide a restraining device which is economical to produce and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DESCRIPTION OF THE DRAWINGS

FIG. 1 is a pictorial representation of a patient undergoing treatment by a pinhole collimator used in conjunction with a Gamma Scintillation Camera, the head of the patient being held in position by the restraining device of this invention;

FIG. 2 is an exploded side elevational view of the adapter ring of the restraining device of this invention utilized in conjunction with the pinhole collimator of a Gamma Scintillation Camera;

FIG. 3 is an end view of the holder of the restraining device of this invention shown in FIG. 1;

DETAILED DESCRIPTION OF THE PREFERRED EMBODIMENTS

Figure 4:
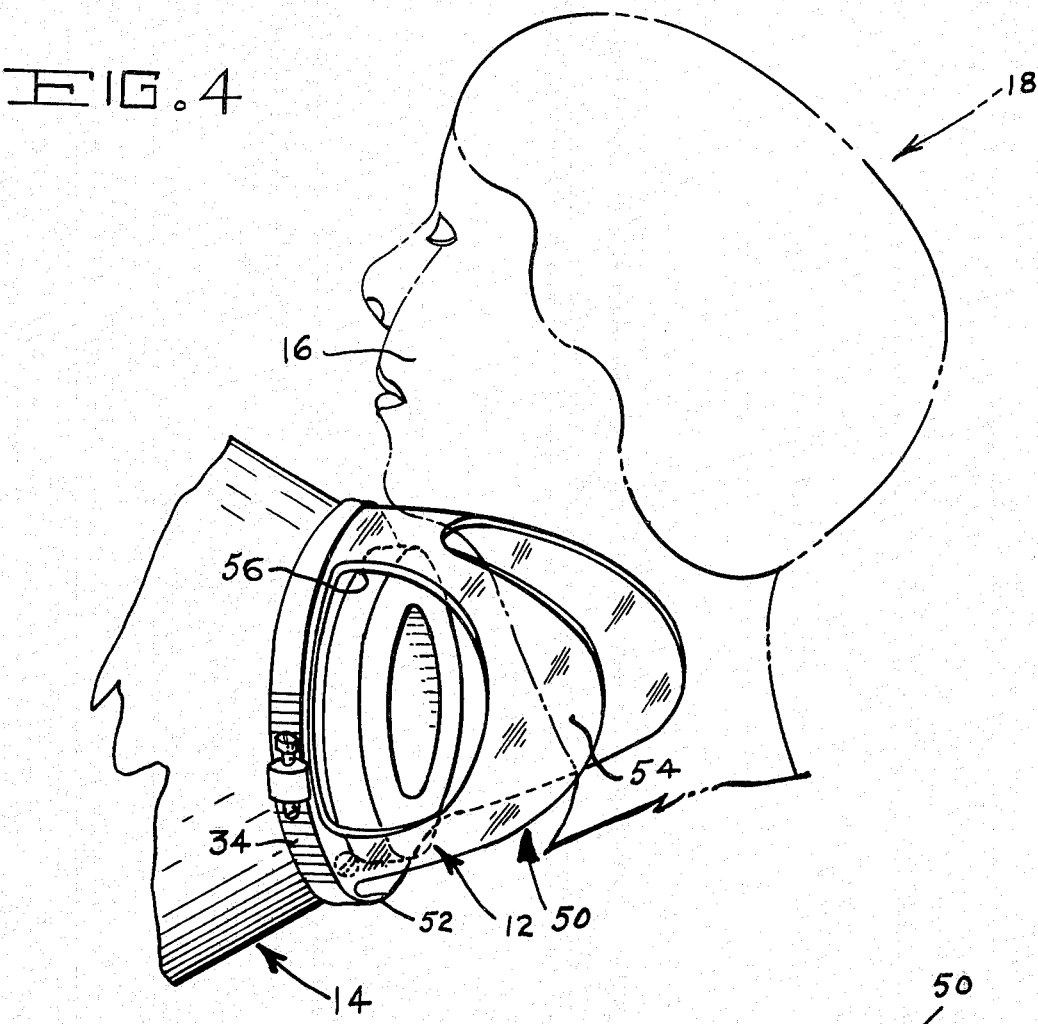
FIG. 4 is a pictorial representation of a modified restraining device of this invention utilized to position a patient undergoing treatment by a Gamma Scintillation Camera.

Reference is now made to FIG. 1 of the drawing which shows in pictorial fashion the restraining device 10 of this invention mounted upon a pinhole collimator 12 utilized with a conventional Gamma Scintillation Camera 14. In this Figure the head 16 of a patient 18 is shown having its chin supported on restraining device 10 while the thyroid gland is undergoing scanning by camera 14.

Restraining device 10 of this invention is made up of two basic component elements, a holder 20 and an extension or adapter ring 22 best shown in FIG. 2. Adapter ring 22 has a scaled mounting element 24 which is preferably of a cylindrical configuration and conformed to matingly mount upon pinhole collimator 12 of a conventional scintillation camera 14. Scaled element 24 has a plurality of equally spaced reference marks 26 on at least one side thereof to be utilized in conjunction with holder 20 in a manner to be set forth hereinbelow. Scaled element 24 is held in position on pinhole collimator 12 by a face plate 28 abutting thereagainst and a plurality of securing elements such as bolts 30. Once in position about collimator 12 adapter ring 22 is utilized to adjustably secure in position a plurality of holders 20, 50, 60 and 70 as clearly shown in FIGS. 1 and 3-9 of the drawing.

Restraining device 10 as well as adapter ring 22 are made of any suitable low Z number material such as aluminum or plastic. It is preferred that adapter ring 22 be manufactured of aluminum while holder 20 be manufactured from plastic.

Reference is now made to FIGS. 1 and 3 of the drawing which show holder 20 having a base portion 32 of cylindrical configuration so as to conform to the external dimension of scaled element 24 and being capable of slideable engagement therewith. A slot or split 33 formed within base portion 32 allows for easy mounting on element 24. Any suitable clamping means such as adjustable hose clamp 34 securely positions holder 20 upon scaled element 24 in a predetermined relationship with respect to a particular reference mark 26. As a result thereof the focal length or area of collimator 12 can be easily altered. Holder 20 has a central portion 36 which extends from base 32 in an upward and outward direction and terminates in an upper portion 38 of a U-shaped configuration so as to accommodate and securely position the chin of a patient 18 while undergoing treatment by camera 14. For additional comfort to the user any suitable padding 40 such as vinyl coated foam rubber can be attached by any suitable adhesive such as glue to the upper portion 38 of holder 20.

In addition to holder 20 shown in FIGS. 1 and 3 of the drawings, a plurality of other holders 50, 60 and 70 set forth hereinbelow can be mounted on adapter ring 22 for use in the examination of a variety of other areas of a patient's anatomy. For simplicity of manufacture each holder may be produced from ¼ inch plastic, 6 inch outer diameter tubing, with the tubing cut and heat formed to the desired configurations and dimensions.

Figure 5:
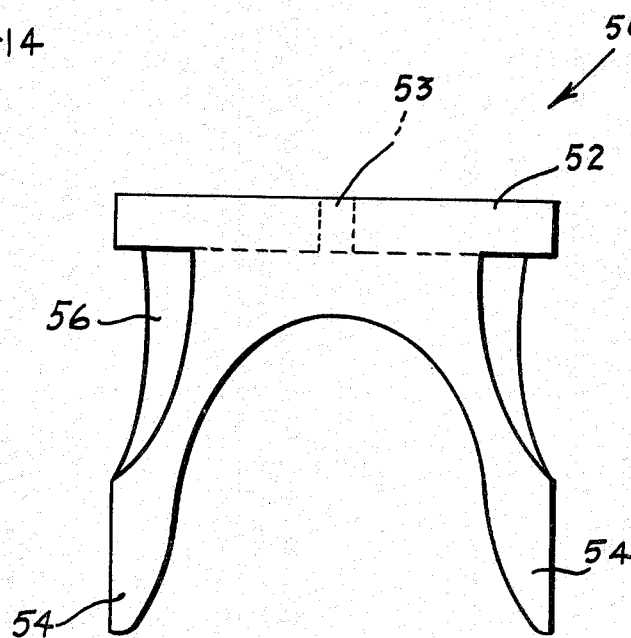
FIG. 5 is a plan view of the holder of the restraining device of this invention shown in FIG. 4.

For continued examination of the thyroid gland of a patient 18 reference is now made to FIGS. 4 and 5 of the drawing which show in detail another embodiment of the instant invention in the form of holder 50. Holder 50 is shown in these Figures having a base portion 52 which is conformed to fit around scaled element 24 of adapter ring 22. As with holder 20 a slot or split 53 aids in the mounting arrangement. A central portion 54 extends on two sides from base portion 52 and takes on a U-shaped configuration so as to accommodate the neck of a patient. In addition central portion 54 has cutouts 56 formed therein not only for the comfort of the user but also so as to maintain its lightweight. Once in position about scaled element 24 any securing means 34 such as shown in FIG. 4 can fixedly secure holder 50 in the desired position with respect to reference marks 26.

Figure 6:
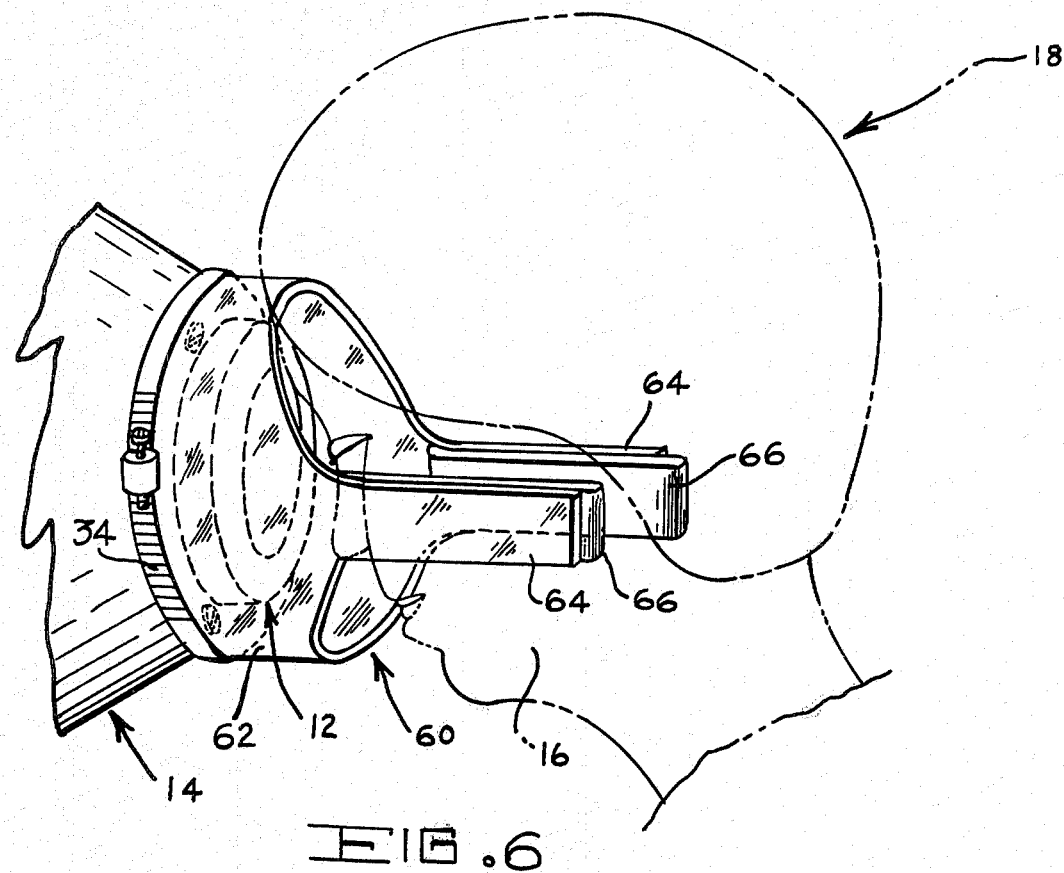
FIG. 6 is a pictorial representation of another modified restraining device of this invention used to position a patient undergoing a treatment by a Gamma Scintillation Camera.
Figure 7:
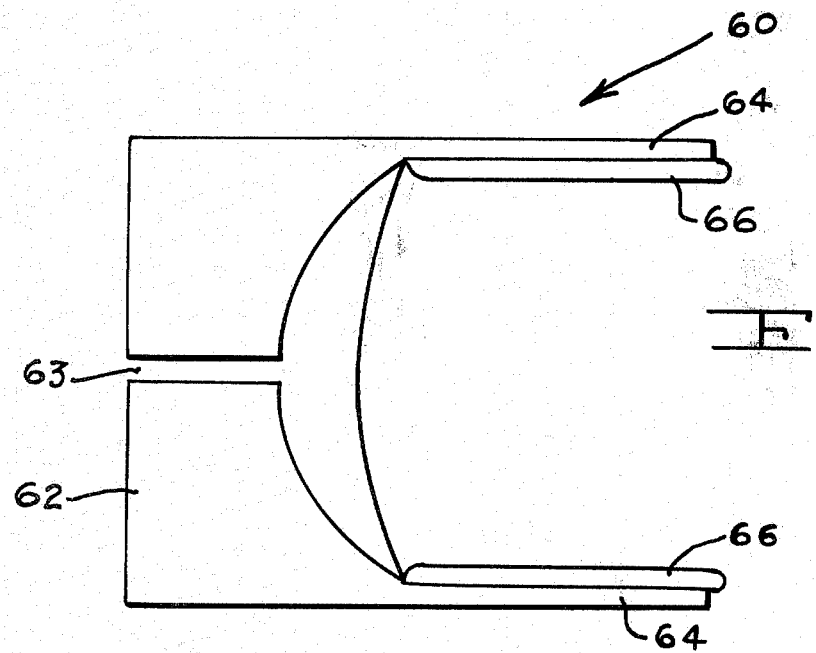
FIG. 7 is a plan view of the holder of the restraining device of this invention shown in FIG. 6.

Attention is now directed to FIGS. 6 and 7 of the drawing which show another embodiment of this invention in the form of holder 60. Holder 60 is utilized for brain or optical scanning by scintillation camera 14 and has a wide base portion 62 sized to fit about scaled element 24 of adapter ring 22. A slot or split 63 is also formed therein. Protruding from base portion 62 are a pair of elongated extensions 64. Any suitable resilient padding 66 such as foam rubber may be fixedly secured by an adhesive to the interior of each extension 64 in order that holder 60 may comfortably fit about the head of a patient 18 undergoing treatment.

Figure 8:
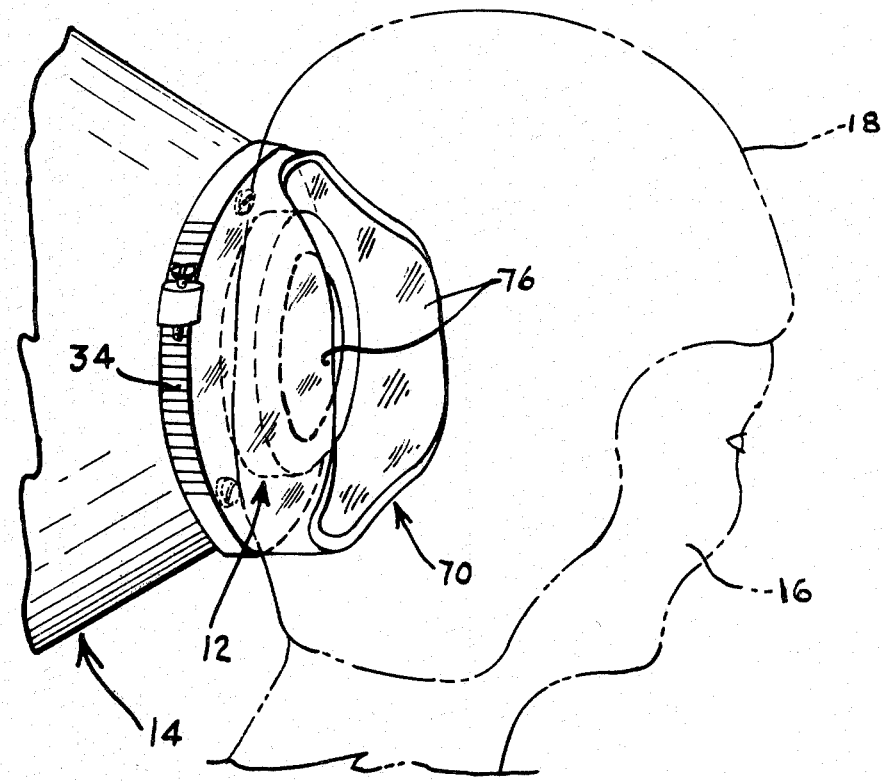
FIG. 8 is a pictorial representation of still another modified restraining device utilized to position a patient undergoing treatment by a Gamma Scintillation Camera.
Figure 9:
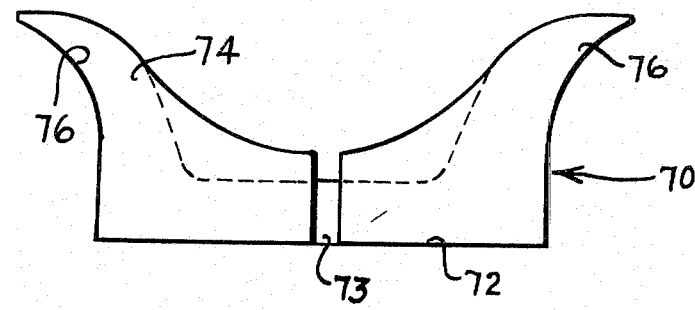
FIG. 9 is a plan view of the holder of the restraining device of this invention shown in FIG. 8.

Reference is now made to FIGS. 8 and 9 of the drawing which show still another embodiment of the instant invention in the form of holder 70. Holder 70 is utilized for brain scans of a patient and has a base portion 72 with slot or split 73 contained therein sized to fit about the scaled element 24 of adapter ring 22. An upper portion 74 having an interior of concave configuration is formed directly adjacent base portion 72. Upper portion 74 flares to circumferentially formed extensions 76 which can encompass the side of the head 16 including the ear of a patient 18. All holders described hereinabove are preferably made of plastic and are easily attachable to adapter ring 22 in order to form patient restraining device 10 of this invention. In addition the adjustability feature of this invention allows for a plurality of scans of the thyroid, brain or optical system of a patient without resort to complicated restraining means. Furthermore, these scans can now be performed with a minimum of Gamma backscattering while the patient is in the seated portion and extremely comfortable during the entire scintiphotography operation.

Although this invention has been described with reference to particular embodiments it will be understood to those skilled in the art that this invention is also capable of a variety of still other embodiments within the spirit and scope of the appended claims.

I claim:

1. The combination of a restraining device and pinhole collimator of a Gamma Scintillation Camera, said restraining device comprising a holder and an adapter, said adapter being in the form of a scaled mounting element slideably mounted on said pinhole collimator, a plurality of reference marks scribed on at least one side of said scaled element, said scaled element being of a hollow cylindrical configuration thereby allowing said pinhole collimator to operate therethrough and means for removeably securing said scaied element to said collimator, said holder having a body portion, said body portion being adjustably mounted upon said scaled element and being slideable with respect to said reference marks on said scaled element, said body portion of said holder having a base containing a split therein, a clamp encompassing said holder base for adjustably securing said holder to said scaled element whereby the focal area of said collimator can be altered by altering the specific position in which said holder is secured with respect to said adapter and said holder having a configuration capable of fixedly positioning a specific area of a patient in operative alignment with said pinhole collimator.

2. The combination as defined in claim 1 wherein said holder body has an upper portion, said upper portion having a U-shaped configuration for fixedly supporting the chin of a patient with respect to said collimator and means on said upper portion for comfortably supporting said chin on said upper portion.

3. The combination as defined in claim 1 wherein said holder body has a central portion having a concavely-shaped configuration for fixedly supporting the neck of a patient with respect to said collimator.

4. The combination as defined in claim 1 wherein said holder body has a central portion having a pair of extensions protruding therefrom for fixedly supporting the head of a patient with respect to said collimator and means for comfortably supporting said head in said extensions.

5. A restraining device comprising a holder and an adapter, said adapter having a scaled mounting element, said scaled element having a plurality of reference marks thereon, said holder having a body portion, said body portion being adjustably mounted upon said scaled element and being slideable with respect to said reference marks on said scaled element, said body portion of said holder having a base containing a split therein, a clamp encompassing said holder base for adjustably securing said holder to said scaled element and said holder having a configuration capable of fixedly positioning a specific area of a patient in operative alignment with the collimator of a Gamma Scintillation Camera.

6. A restraining device as defined in claim 5 wherein said holder body has an upper portion, said upper portion having a U-shaped configuration for fixedly supporting the chin of a patient with respect to said collimator and means on said upper portion for comfortably supporting said chin on said upper portion.

7. A restraining device as defined in claim 5 wherein said holder body has a central portion having a concavely-shaped configuration for fixedly supporting the neck of a patient with respect to said collimator.

8. A restraining device as defined in claim 5 wherein said holder body has a central portion having a pair of extensions protruding therefrom for fixedly supporting the head of a patient with respect to said collimator and means for comfortably supporting said head in said extensions.

* * * * *